United States Patent
Habu

(10) Patent No.: US 9,761,146 B2
(45) Date of Patent: Sep. 12, 2017

(54) DRIVING SUPPORT APPARATUS FOR A VEHICLE

(71) Applicant: DENSO CORPORATION, Kariya, Aichi-pref. (JP)

(72) Inventor: Toshiya Habu, Nishio (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/346,593

(22) Filed: Nov. 8, 2016

(65) Prior Publication Data

US 2017/0132933 A1 May 11, 2017

(30) Foreign Application Priority Data

Nov. 9, 2015 (JP) ................. 2015-219820

(51) Int. Cl.
 *B60Q 1/00* (2006.01)
 *G08G 1/16* (2006.01)
 *B60Q 5/00* (2006.01)

(52) U.S. Cl.
 CPC ............. *G08G 1/167* (2013.01); *B60Q 5/006* (2013.01)

(58) Field of Classification Search
 CPC ...... G01S 17/023; G01S 17/87; G01S 17/936; G01S 2013/9375; G01S 2013/9378; G01S 2013/9382; G01S 2013/9385; G01S 7/4802; G01S 7/4817
 USPC ............ 340/435, 438; 701/41, 431; 348/118
 See application file for complete search history.

(56) References Cited

U.S. PATENT DOCUMENTS

| 5,602,375 | A | * | 2/1997 | Sunahara | G07B 15/063 235/375 |
| 2006/0031008 | A1 | * | 2/2006 | Kimura | G01C 21/3655 701/437 |
| 2006/0184297 | A1 | * | 8/2006 | Higgins-Luthman | B60R 1/00 701/41 |
| 2012/0268260 | A1 | * | 10/2012 | Miller | B60W 50/14 340/435 |
| 2016/0291134 | A1 | * | 10/2016 | Droz | G01S 7/4802 |
| 2016/0364621 | A1 | * | 12/2016 | Hill | G06K 9/00805 |

FOREIGN PATENT DOCUMENTS

JP 2008-117054 A 5/2008

* cited by examiner

*Primary Examiner* — Ojiako Nwugo
(74) *Attorney, Agent, or Firm* — Knobbe, Martens, Olson & Bear, LLP

(57) ABSTRACT

A driving support apparatus for a vehicle is provided. The apparatus causes an alarm unit to issue an alarm based on a lane marking of an own lane in which an own vehicle runs. The apparatus includes a leading vehicle detection section that determines a leading vehicle running in the own lane, a crossing over determination section that determines whether or not the leading vehicle has crossed over the lane marking present at an opposite side of the target, when a target is present at a left side or a right side of the leading vehicle in the own lane, and an alarm inhibition section that inhibits the alarm based on a result of the determination whether or not the leading vehicle has crossed over the lane marking present at the opposite side of the target.

7 Claims, 3 Drawing Sheets

DRIVING SUPPORT APPARATUS FOR A VEHICLE

CROSS-REFERENCE TO RELATED APPLICATION

This application is based on and claims the benefit of priority from earlier Japanese Patent Application No. 2015-219820 filed Nov. 9, 2015, the description of which is incorporated herein by reference.

BACKGROUND (Technical Field)

The present invention relates to a driving support apparatus for a vehicle.

(Related Art)

Conventionally, various driving support techniques have been proposed which are for supporting driving of the driver of a vehicle. For example, a technique is known in which when an own vehicle has deviated from a driving lane, an alarm is issued to the driver of the own vehicle (e.g. refer to JP-A-2008-117054).

However, in the above conventional technique, it can be considered that deviation of the own vehicle from the traveling lane is allowed in some surrounding environments in which, for example, there are stopped or parked vehicles, persons, structures, or the like at the edge of the lane in which the own vehicle runs. In this case, it can be considered that an alarm indicating that the own vehicle has deviated from the traveling lane may be unnecessarily issued though the driver is purposefully making the own vehicle deviate from the driving lane. In this regard, if an unnecessary alarm is issued, the driver may feel discomfort. Hence, There is room for improvement.

SUMMARY

An embodiment provides a driving support apparatus for a vehicle, the apparatus being able to appropriately cause an alarm to be issued which indicates that an own vehicle has crossed over a lane marking.

As an aspect of the embodiment, a driving support apparatus for a vehicle is provided. The apparatus causes an alarm unit to issue an alarm based on a lane marking of an own lane in which an own vehicle runs. The apparatus includes: a leading vehicle detection section that determines a leading vehicle running in the own lane; a crossing over determination section that determines whether or not the leading vehicle has crossed over the lane marking present at an opposite side of the target, when a target is present at a left side or a right side of the leading vehicle in the own lane; and an alarm inhibition section that inhibits the alarm based on a result of the determination whether or not the leading vehicle has crossed over the lane marking present at the opposite side of the target.

DETAILED DESCRIPTION OF THE PREFERRED EMBODIMENTS

First Embodiment

Hereinafter, an embodiment of a driving support apparatus for a vehicle will be descried with reference to the drawings. The driving support apparatus according to the present embodiment is mounted in the vehicle, and performs various driving support processes when the driver drives the vehicle. First, the schematic configuration of the driving support system will be described with reference to FIG. 1.

Figure 1:
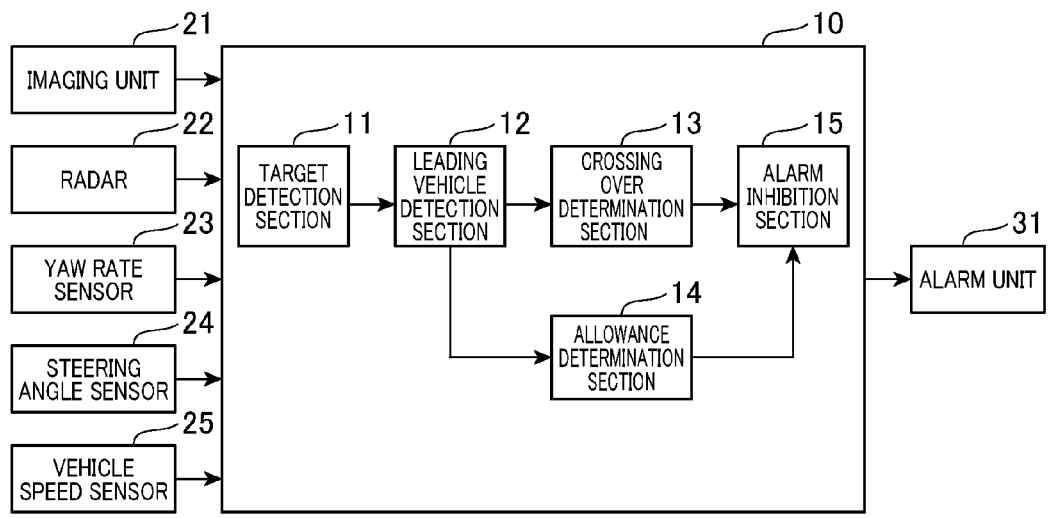
FIG. 1 is a drawing showing a configuration of a driving support system.

In FIG. 1, a driving support ECU 10, which is a driving support apparatus, is connected with an imaging unit 21, a radar 22, a yaw rate sensor 23, a steering angle sensor 24, and a vehicle speed sensor 25, from each of which the driving support ECU 10 receives detection signals and various kinds of information.

The imaging unit 21 is an in-vehicle camera and includes a CCD camera, a CMOS image sensor, a near-infrared camera, or the like. The imaging unit 21 acquires images of surrounding environments of the vehicle including a driving lane of the vehicle. Then, the imaging unit 21 generates image data representing the acquired images and sequentially outputs the image data to the driving support ECU 10. The imaging unit 21 is disposed, for example, in the vicinity of the upper end of the front windshield of the vehicle, and acquires images of an area extending ahead of the vehicle and in a predetermined angular range centering on the imaging axis thereof. Note that the imaging unit 21 may be a monocular camera or a stereo camera.

The radar 22 transmits an electromagnetic wave as a transmission wave and receives a reflected wave thereof to detect a target, and is configured by a millimeter-wave radar, a laser radar, or the like. The radar 22 is mounted on the front part of the vehicle, and scans an area, which extends ahead of the vehicle and over a range of a predetermined angle centering on the optical axis thereof with, a radar signal. Then, the radar 22 generates distance measurement data based on the time period between the transmission of an electromagnetic wave ahead of the vehicle and the reception of a reflected wave, and sequentially outputs the generated data to the driving support ECU 10. The distance measurement data includes information on a direction in which an object is present, the distance to the object, and a relative speed.

The yaw rate sensor 23 has, for example, an oscillator such as a tuning fork, and detects distortion generated in the oscillator based on the yaw moment of the own vehicle to detect a yaw angle of the own vehicle. The steering angle sensor 24 detects an operation angle of the steering wheel, that is, a steering angle. The vehicle sensor 25 is provided to a rotating shaft transferring power to the wheels of the vehicle, and outputs a detection signal depending on the vehicle speed.

In addition, the driving support ECU 10 is connected with an alarm unit 31. The alarm unit 31 informs the driver of the fact that a dangerous situation has arisen in the own vehicle, the fact that any prohibited act has been carried out, or the like. The alarm unit 31 is, for example, a loudspeaker provided in the vehicle interior. When the driving support ECU 10 outputs a control command, the alarm unit 31 gives information to the driver by a sound or the like. Note that, instead of the alarm of the alarm unit 31, information may be given to the driver by applying reaction force against vibration and driving operation to the driver from the steering wheel. In addition, information may be given to the driver by indication on a display panel such as a display provided to an instrument panel.

The driving support ECU 10 is a computer including a CPU, a ROM, a RAM, and an I/O. The driving support ECU 10 executes a program installed in the ROM to achieve various functions. Specifically, as basic operation, the driving support ECU 10 determines whether or not the own vehicle has crossed over a lane marking of the lane in which the own vehicle runs (hereinafter, referred to as own lane). If the driving support ECU 10 determines that the own vehicle has crossed over a lane marking, the driving support ECU 10 outputs a control command to the alarm unit 31. Thereby, the alarm unit 31 gives information to the driver.

In addition, in the present embodiment, even when the own vehicle has crossed over a lane marking of the own lane, issuing an alarm is inhibited if the own vehicle is allowed to cross over the lane marking. As a means for inhibiting an alarm, the driving support ECU 10 achieves, in addition to the above functions, functions of a target detection section 11, a leading vehicle detection section 12, a crossing over determination section 13, an allowance determination section 14, and an alarm inhibition section 15.

Based on information (image data and distance measurement data) on an object obtained by the imaging unit 21 and the radar 22, the target detection section 11 detects a target included in the data. For example, the target detection section 11 combines information on the object extracted from the image data of the imaging unit 21 with information on the object extracted from the distance measurement data of the radar 22 to detect a target. Instead of this, a target may be detected by using any one of the information on the object extracted from the image data of the imaging unit 21 and the information on the object extracted from the distance measurement data of the radar 22. The target detected by the target detection section 11 is output to the leading vehicle detection section 12.

Based on the target detected by the target detection section 11, the leading vehicle detection section 12 detects a forward vehicle, which is one of the vehicles running ahead of the own vehicle and in the own lane, in which the own vehicle runs, as a leading vehicle on condition that the forward vehicle is closest to the own vehicle (the distance between the own vehicle and the forward vehicle is shorter than the distances between the own vehicle and other vehicles running ahead of the own vehicle and in the own lane). In addition to the above, a leading vehicle may be detected by using a lateral distance between a travel path of the forward vehicle and the own vehicle or an own lane probability map. In addition, the leading vehicle detection section 12 detects one of the forward vehicles as a leading vehicle on condition that the difference between the width of the own vehicle and the width of the leading vehicle is equal to or less than a threshold value Th1.

The crossing over determination section 13 determines whether or not the leading vehicle has crossed over a lane marking of the own lane. Specifically, the crossing over determination section 13 recognizes a white line (lane marking) of the own lane based on the imaging result of the imaging unit 21. Then, the crossing over determination section 13 detects an obstacle at the left side or the right side of the leading vehicle in the own lane, and determines whether or not the leading vehicle has crossed over a lane marking present at the opposite side of the obstacle. The result of the determination whether or not the leading vehicle has crossed over a lane marking present at the opposite side of the obstacle is output to the alarm inhibition section 15. Note that the lane marking is not limited to a white line but may be a solid line such as a yellow line, or Botts' Dots. Furthermore, the lane marking may be a virtual lane obtained based on roadside information on guardrails or the like.

The allowance determination section 14 determines whether or not the own vehicle is in a situation in which the own vehicle is allowed to cross over a lane marking. Specifically, it is determined whether or not the own vehicle is in a situation in which the own vehicle is allowed to run while crossing over a lane marking based on the size of a travel area (available unobstructed travel area) of the own vehicle, the travel area being other than an area of the own lane which is occupied by obstacles. The result of the determination whether or not the own vehicle is allowed to cross over a lane marking is output to the alarm inhibition section 15.

The alarm inhibition section 15 determines not to cause an alarm to be issued even when the own vehicle has crossed over a lane marking, based on the result of the determination whether or not the leading vehicle has crossed over the lane marking present at the opposite side of the obstacle and the result of the determination whether or not the own vehicle is allowed to cross over the lane marking.

The inhibition about an alarm will be further described. Depending on the surrounding environments of the own vehicle in which, for example, there are obstacles such as stopped or parked vehicles, persons, structures, and the like at the edge of the own lane, it can be considered that the own vehicle may be allowed to cross over a lane marking.

Figure 2:
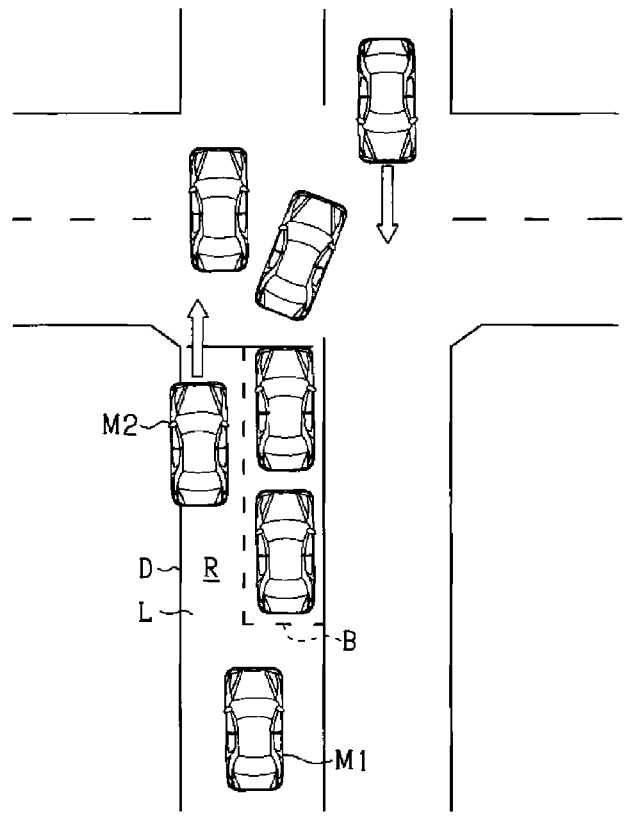
FIG. 2 is a drawing showing a situation in which a vehicle is allowed to cross over a lane marking.

Referring to FIG. 2, a specific example will be described in which an own vehicle is allowed to cross over a lane marking. In FIG. 2, an own vehicle M1 and a leading vehicle M2 running ahead of the own vehicle M1 are running in a straight line in an own lane L, and vehicles are present, which are waiting for right turning, at the right side of the leading vehicle M2. In this case, the vehicles waiting for right turning in the own lane L are present as an obstacle B with respect to the leading vehicle M2 and the own vehicle M1 running in a straight line in the own lane L. As shown in FIG. 2, when the leading vehicle M2 runs in the own lane L and in a travel area R at the left side of the obstacle B, if the travel area R is narrower than the width of the leading vehicle M2, the leading vehicle M2 crosses over a lane marking D opposite to the obstacle B. In addition, also when the own vehicle M1 runs in the travel area R following the leading vehicle M2, the own vehicle M1 crosses over the lane marking D. At this time, the alarm unit 31 issues an alarm indicating that the own vehicle M1 has crossed over the lane marking D. In this case, although the driver has purposefully made the own vehicle M1 cross over the lane marking D, an alarm indicating that the own vehicle M1 has crossed over the lane marking D is unnecessarily issued.

Thus, in the present embodiment, if the crossing over determination section 13 determines that the leading vehicle has crossed over the lane marking opposite to the obstacle, and if the allowance determination section 14 determines that the width of the leading vehicle is smaller than that of the travel area, the alarm inhibition section 15 determines not to cause an alarm to be issued even if the own vehicle crosses over the lane marking.

Figure 3:
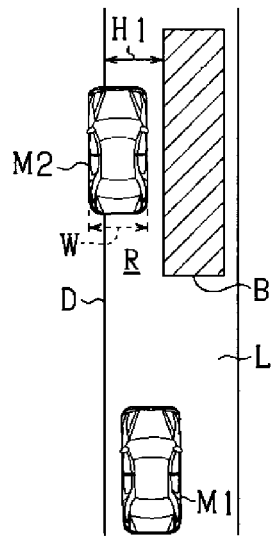
FIG. 3 is a drawing illustrating a lateral distance H1 and allowance determination.

The determination whether or not the own vehicle is allowed to cross over a lane marking will be described with reference to FIG. 3. In FIG. 3, the own vehicle M1 and the leading vehicle M2 running ahead of the own vehicle M1 are running in the own lane L, and the obstacle B is present right next to the leading vehicle M2. In addition, the lane marking D is present at the left side of the leading vehicle M2. The allowance determination section 14 obtains a lateral distance H1, which is a distance between the lateral position of the lane marking D in the lane width direction and the lateral position of the obstacle B, and the width W of the leading vehicle M2, and determines whether or not the width W of the leading vehicle M2 is larger than the lateral distance H1. Note that the lateral distance H1 and the width W are obtained from the imaging result of the imaging unit 2. If the width W of the leading vehicle M2 is larger than the lateral distance H1, when the leading vehicle M2 runs in the travel area R, the leading vehicle M2 crosses over the lane marking D. In this case, when the own vehicle M1 runs in the travel area R following the leading vehicle M2, it can be considered that the driver of the own vehicle M1 purposefully makes the own vehicle M1 cross over the lane marking D. Hence, when the leading vehicle M2 has crossed over the lane marking D, if it is determined that the width W of the leading vehicle M2 is larger than the lateral distance H1, it is determined that an alarm is not caused to be issued even if the own vehicle M1 crosses over the lane marking D.

Figure 4:
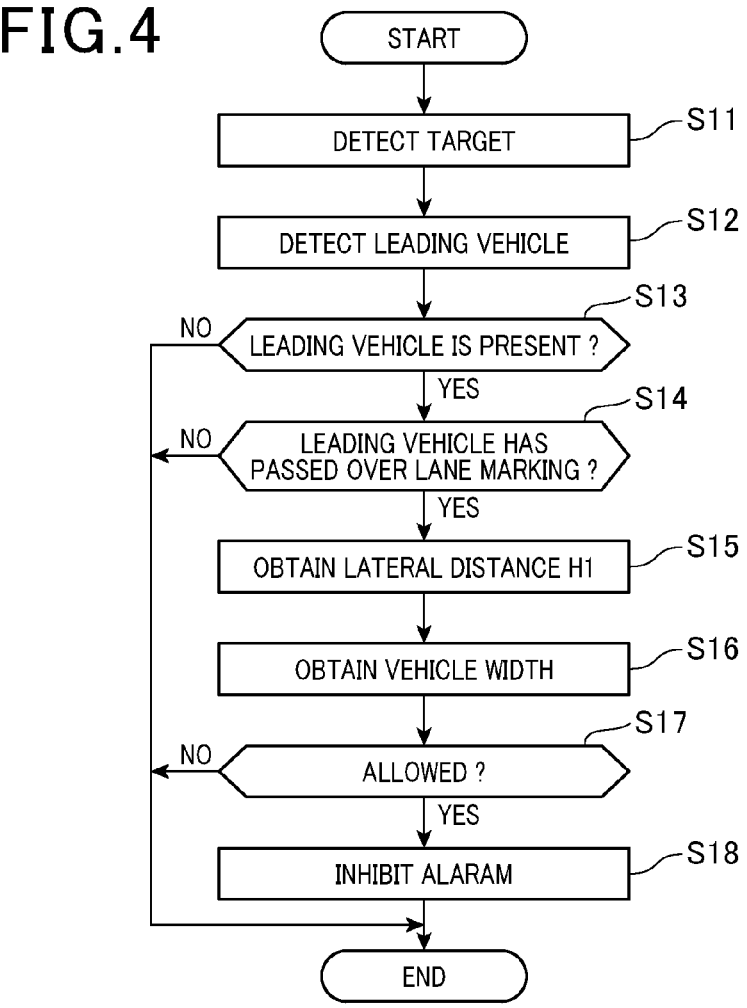
FIG. 4 is a flowchart illustrating a processing procedure for inhibiting an alarm.

Next, a processing procedure for inhibiting an alarm performed by the driving support ECU 10 will be described with reference to the flowchart in FIG. 4. The present process is repeatedly performed by the driving support ECU 10 at predetermined intervals while the vehicle is running.

First, in steps S11 and S12, the target detection section 11 detects a target so that the leading vehicle detection section 12 detects a leading vehicle based on the target. Next, in step S13, the leading vehicle detection section 12 determines whether or not a leading vehicle is detected. If Yes in step 13, the present process proceeds to step S14. In S14, if an obstacle is present at the left side or the right side of the leading vehicle in the own lane, the crossing over determination section 13 determines whether or not the leading vehicle has passed over a lane marking present at the opposite side of the obstacle. In this case, the crossing over determination section 13 may determine that the leading vehicle has passed over the lane marking present at the opposite side of the obstacle when the leading vehicle has actually passed over the lane marking present at the opposite side of the obstacle.

If Yes in step S14, the present process proceeds to steps S15 and S16, in which the leading vehicle detection section 12 detects the lateral distance H1 and the width of the leading vehicle. Next, in step S17, the allowance determination section 14 determines whether or not the own vehicle is allowed to cross over the lane marking based on the lateral distance H1 and the width of the leading vehicle.

If YES in step S17, the present process proceeds to step S18. In step S18, even if the own vehicle has crossed over the lane marking when the own vehicle runs in the travel area, the alarm inhibition section 15 determines that an alarm is not caused to be issued. Then, the present process is ended.

According to the present embodiment described above, the following excellent advantageous effects can be obtained.

In the above configuration, when an obstacle is detected at the right or the left of the leading vehicle, and the leading vehicle has crossed over the lane marking present at the opposite side of the obstacle, issuing an alarm performed when the own vehicle has passed over the lane marking is inhibited. In this case, it is determined whether or not an alarm indicating that the own vehicle has crossed over the lane marking is necessary, and even if the own vehicle has crossed over the lane marking, an alarm is not issued if unnecessary. Hence, an unnecessary alarm can be inhibited from being issued. As a result, an alarm indicating that the own vehicle has crossed over the lane marking can be appropriately issued.

In the above configuration, it is determined whether or not the own vehicle is allowed to cross over the lane marking based on the size of the travel area. If it is determined to be allowed, an alarm is inhibited from being issued. In this case, since it is determined whether or not the own vehicle is allowed to cross over the lane marking, and an unnecessary alarm is inhibited from being issued, an unnecessary alarm can be appropriately inhibited from being issued.

In the above configuration, if the width of the leading vehicle is larger than the lateral distance H1 between the lane marking and the target, it is determined that the own vehicle is allowed to cross over the lane marking. In this case, if the width of the leading vehicle is larger than the lateral distance H1, it is determined that the own vehicle crosses over the lane marking when running in the travel area, whereby the own vehicle is allowed to cross over the lane marking. Hence, before the own vehicle runs in the travel area, it can be determined whether or not the own vehicle is allowed to cross over the lane marking.

Second Embodiment

Next, the second embodiment will be described. In the following description, the configurations similar to those of the above embodiment are denoted by the same reference numerals, and redundant descriptions are appropriately omitted.

Figure 5:
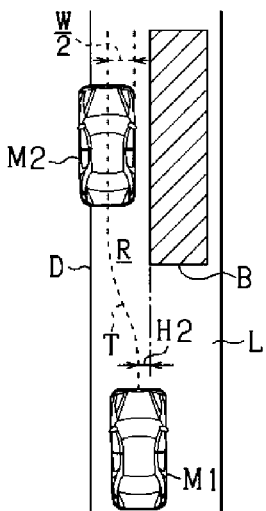
FIG. 5 is a drawing illustrating a lateral distance H2 and allowance determination.

A travel path extending from the center position in the width direction of the leading vehicle may be generated. Based on a lateral distance, which is a distance between a position on the travel path (path position) and a lateral position of an obstacle, it may be determined whether or not the own vehicle is allowed to cross over a lane marking. In FIG. 5, a travel path T is generated based on, for example, positions of the leading vehicle obtained at predetermined intervals. Then, the allowance determination section 14 obtains a lateral distance H2 between the position of the leading vehicle M2 on the travel path (path position) T of the leading vehicle M2 and the lateral position of the obstacle B, the position being obtained before the leading vehicle M2 reaches the travel area R, and the width W of the leading vehicle M2, and determines whether or not the half of the width W of the leading vehicle M2 is larger than the lateral distance H2. If the half of the width W of the leading vehicle M2 is larger than the lateral distance H2, when the leading vehicle M2 runs in the travel area R, the leading vehicle M2 crosses over the lane marking D to avoid the obstacle B. In this case, when the own vehicle M1 runs in the travel area R following the leading vehicle M2, it can be considered that the driver of the own vehicle M1 purposefully makes the own vehicle M1 cross over the lane marking D. Hence, when the leading vehicle M2 has crossed over the lane marking D, if it is determined that the half of the width W of the leading vehicle M2 is larer than the lateral distance H2, it is determined that an alarm should not be caused to be issued even if the own vehicle M1 crosses over the lane marking D.

Figure 6:
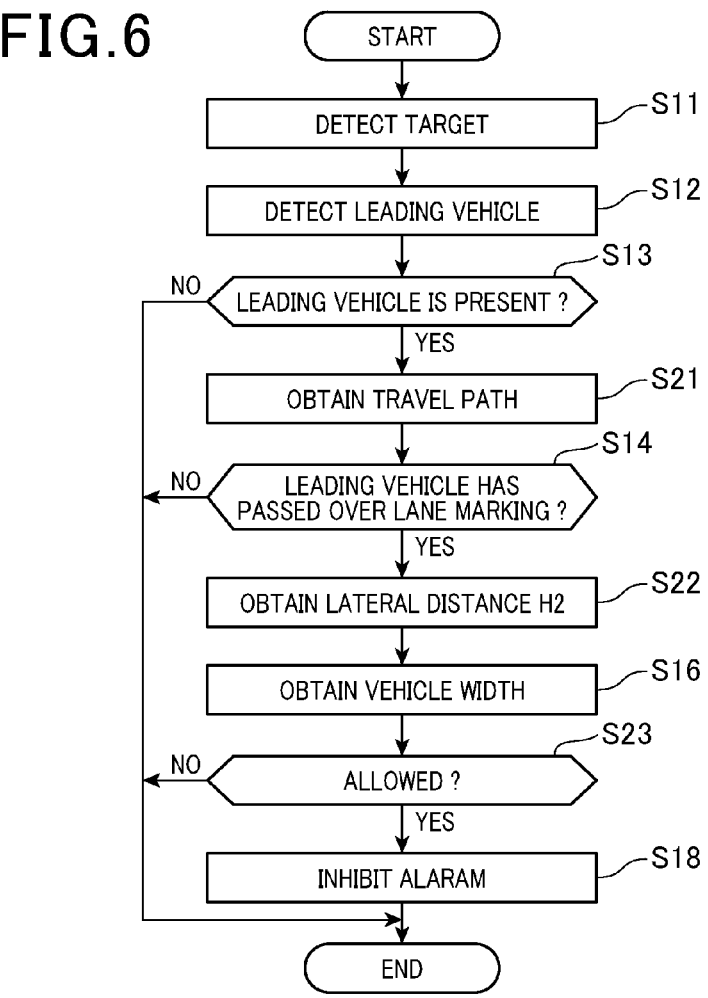
FIG. 6 is a flowchart illustrating a processing procedure for inhibiting an alarm.

Next, a processing procedure for inhibiting an alarm performed by the driving support ECU 10 will be described with reference to the flowchart in FIG. 6. The present process is performed instead of the process of FIG. 4. In FIG. 6, the same steps as those of FIG. 4 are denoted by the same step numbers. FIG. 6 differs from FIG. 4 in that steps S21 to S23 are added.

In steps S11 to S13, the leading vehicle detection section 12 determines that a leading vehicle is detected. Next, in step S21, the leading vehicle detection section 12 obtains a travel path of the leading vehicle. In step S14, if the crossing over determination section 13 determines that the leading vehicle has passed over a lane marking, in steps S22 and S16, the leading vehicle detection section 12 obtains the lateral distance H2 and the width of the leading vehicle. Next, in step S23, the allowance determination section 14 determines whether or not the own vehicle is allowed to cross over the lane marking based on the lateral distance H2 and the half of the width W.

According to the present embodiment described above, the following excellent advantageous effects can be obtained.

In the above configuration, if the half of the width of the leading vehicle is larger than the lateral distance H2 between the position on the path (path position) and the obstacle, it is determined that the own vehicle is allowed to cross over the lane marking. In this case, it can be determined whether or not the own vehicle is allowed to cross over the lane marking based on the positional relationship between the leading vehicle and the obstacle in the lane width direction.

Other Embodiments

The above embodiments may be modified as below.

Even if the width of the leading vehicle is larger than the lateral distance H1, which is a lateral distance between the lane marking and the obstacle, when the width of the own vehicle is smaller than the width of the leading vehicle, it can be considered that the own vehicle may run in the travel area without crossing over the lane marking. In this regard, in the first embodiment, if the width of the leading vehicle is larger than the lateral distance H1, the driving support ECU 10 determines that the own vehicle is not allowed to cross over the lane marking. However, this can be modified as below. Even if the width of the leading vehicle is larger than the travel area, when the difference obtained by subtracting the width of the own vehicle from the width of the leading vehicle is equal to or more than a threshold value Th2 (Th2>0), the driving support ECU 10 may determine that the own vehicle is not allowed to cross over the lane marking. In this case, considering the difference between the width of the leading vehicle and the width of the own vehicle, it can be accurately determined whether or not the own vehicle is allowed to cross over the lane marking.

In the first embodiment, it is determined whether or not the own vehicle is allowed to cross over the lane marking based on the width of the leading vehicle. This may be modified so as to determine whether or not the own vehicle is allowed to cross over the lane marking based on the width of the own vehicle. In this case, for example, if the width of the own vehicle is larger than the lateral distance H1 between the lane marking and the obstacle, it may be determined that the own vehicle is allowed to cross over the lane marking. Hence, regardless of the width of the leading vehicle, it can be determined whether or not the own vehicle is allowed to cross over the lane marking. In addition, instead of using the width of the leading vehicle, a predetermined value may be used. In short, it may be determined whether or not the own vehicle is allowed to cross over the lane marking based on the size of the travel area.

In the second embodiment, a travel path of the leading vehicle is generated to obtain the distance between the travel path and an obstacle as the lateral distance H2 between the position on the path (path position) and the obstacle. This may be modified so as to detect a running position of the own vehicle based on the yaw rate sensor 23, the steering angle sensor 24, and the vehicle sensor 25 and generate a travel path of the own vehicle to obtain the distance between the travel path and the obstacle as the lateral distance H2.

When an obstacle is moving, the size of the travel area differs between when the leading vehicle passes through the travel area and when the own vehicle passes through the travel area. In this regard, it may be determined whether or not the own vehicle is allowed to cross over the lane marking based on the moving speed and the moving direction of the obstacle. Thereby, even when the size of the travel area changes as the obstacle moves, it can be determined whether or not the own vehicle is allowed to cross over the lane marking considering the moving speed and the moving direction of the obstacle.

In the above configuration, the present invention is applied to a vehicle driven by driving operation of the driver. However, the present invention may be applied to a vehicle performing follow-up control under which the vehicle follows a leading vehicle based on the running position of the leading vehicle. Under this follow-up control, when the leading vehicle has crossed over the lane marking to avoid an obstacle, the own vehicle following the leading vehicle also crosses over the lane marking if the own vehicle is allowed to cross over the lane marking. At this time, the alarm inhibition section 15 inhibits an alarm of the own vehicle.

Although the alarm inhibition section 15 determines that an alarm is not caused to be issued even when the own vehicle has crossed over the lane marking. This can be changed so as to change the manner of the alarm to inhibit the alarm from being issued.

As an aspect of the embodiment, a driving support apparatus for a vehicle is provided. The apparatus causes an alarm unit (31) to issue an alarm based on a lane marking of an own lane in which an own vehicle (M1) runs. The apparatus includes: a leading vehicle detection section (12) that determines a leading vehicle (M2) running in the own lane; a crossing over determination section (13) that determines whether or not the leading vehicle has crossed over the lane marking present at an opposite side of the target, when a target is present at a left side or a right side of the leading vehicle in the own lane; and an alarm inhibition section (15) that inhibits the alarm based on a result of the determination whether or not the leading vehicle has crossed over the lane marking present at the opposite side of the target.

If a target such as a stopped vehicle or a structure is present in the lane, a travel area of the own vehicle may narrow. In this case, when the own vehicle passes through the travel area, the own vehicle may cross over the lane marking. When the own vehicle crosses over the lane marking, an unnecessary alarm may be issued.

In this regard, when a target is detected at the right or the left of the leading vehicle, and the leading vehicle has crossed over the lane marking present at the opposite side of the target, issuing an alarm performed when the own vehicle has passed over the lane marking is inhibited. In this case, it is determined whether or not an alarm indicating that the own vehicle has crossed over the lane marking is necessary, and even if the own vehicle has crossed over the lane marking, an alarm is not issued if unnecessary. Hence, an unnecessary alarm can be inhibited from being issued. As a result, an alarm indicating that the own vehicle has crossed over the lane marking can be appropriately issued.

It will be appreciated that the present invention is not limited to the configurations described above, but any and all modifications, variations or equivalents, which may occur to those who are skilled in the art, should be considered to fall within the scope of the present invention.

What is claimed is:

1. A driving support apparatus for a vehicle, the apparatus causing an alarm unit to issue an alarm based on a lane marking of an own lane in which an own vehicle runs and comprising:
   a leading vehicle detection section that determines a leading vehicle running in the own lane;
   a crossing over determination section that determines whether or not the leading vehicle has crossed over the lane marking present at an opposite side of the target, when a target is present at a left side or a right side of the leading vehicle in the own lane; and
   an alarm inhibition section that inhibits the alarm based on a result of the determination whether or not the leading vehicle has crossed over the lane marking present at the opposite side of the target.

2. The driving support apparatus according to claim 1, further comprising an allowance determination section that determines whether or not the own vehicle is allowed to cross over the lane marking, based on a size of a travel area of the own vehicle, the travel area being other than an area of the own lane which is occupied by the target, wherein
   the alarm inhibition section inhibits the alarm when the allowance determination section determines that the own vehicle is allowed to cross over the lane marking.

3. The driving support apparatus according to claim 2, further comprising a lateral distance obtainment section that obtains a lateral distance between the lane marking and the target as a size of the travel area, when the target is present at a left side or a right side of the leading vehicle in the own lane, wherein
   the allowance determination section determines that the own vehicle is allowed to cross over the lane marking, when a width of the leading vehicle is larger than the lateral distance.

4. The driving support apparatus according to claim 3, further comprising:
   a calculation section that calculates a difference obtained by subtracting a width of the own vehicle from the width of the leading vehicle; and
   a threshold value determination section that determines whether or not the difference is equal to or more than a predetermined threshold value, wherein
   the allowance determination section determines that the own vehicle is not allowed to cross over the lane marking, when the difference is equal to or more than the threshold value.

5. The driving support apparatus according to claim 2, further comprising a lateral distance obtainment section that obtains a lateral distance between the lane marking and the target as a size of the travel area, when the target is present at a left side or a right side of the leading vehicle in the own lane, wherein
   the allowance determination section determines that the own vehicle is allowed to cross over the lane marking, when a width of the own vehicle is larger than the lateral distance.

6. The driving support apparatus according to claim 1, further comprising:
   a path generation section that generates a travel path of the leading vehicle;
   a lateral distance obtainment section that obtains a second lateral distance between the target and a position of the leading vehicle on the travel path, the position being obtained before the leading vehicle reaches a lateral position of the target, when the target is present at a left side or a right side of the leading vehicle in the own lane; and
   an allowance determination section that determines that the own vehicle is allowed to cross over the lane marking, when half of a width of the leading vehicle is larger than the second lateral distance, wherein
   the alarm inhibition section inhibits the alarm when the allowance determination section determines that the own vehicle is allowed to cross over the lane marking.

7. The driving support apparatus according to claim 2, further comprising a moving state detection section that detects a moving speed and a moving direction of the target in the own lane, wherein
   the allowance determination section determines whether or not the own vehicle is allowed to cross over the lane marking based on the moving speed and the moving direction.

* * * * *